Sept. 13, 1949. H. B. VAN RADEN 2,481,891
DUAL AXLE WHEEL UNIT
Filed May 13, 1946
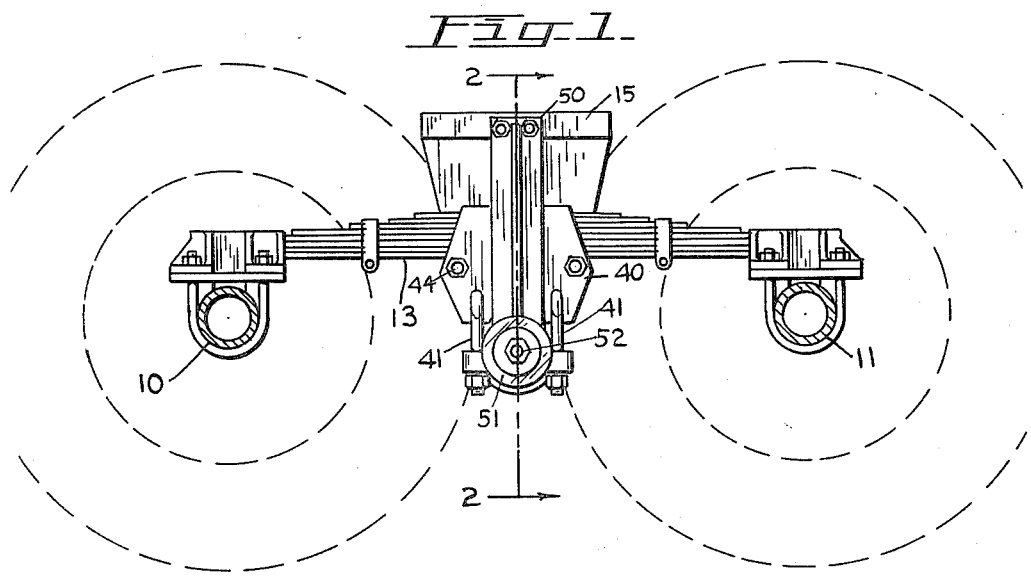
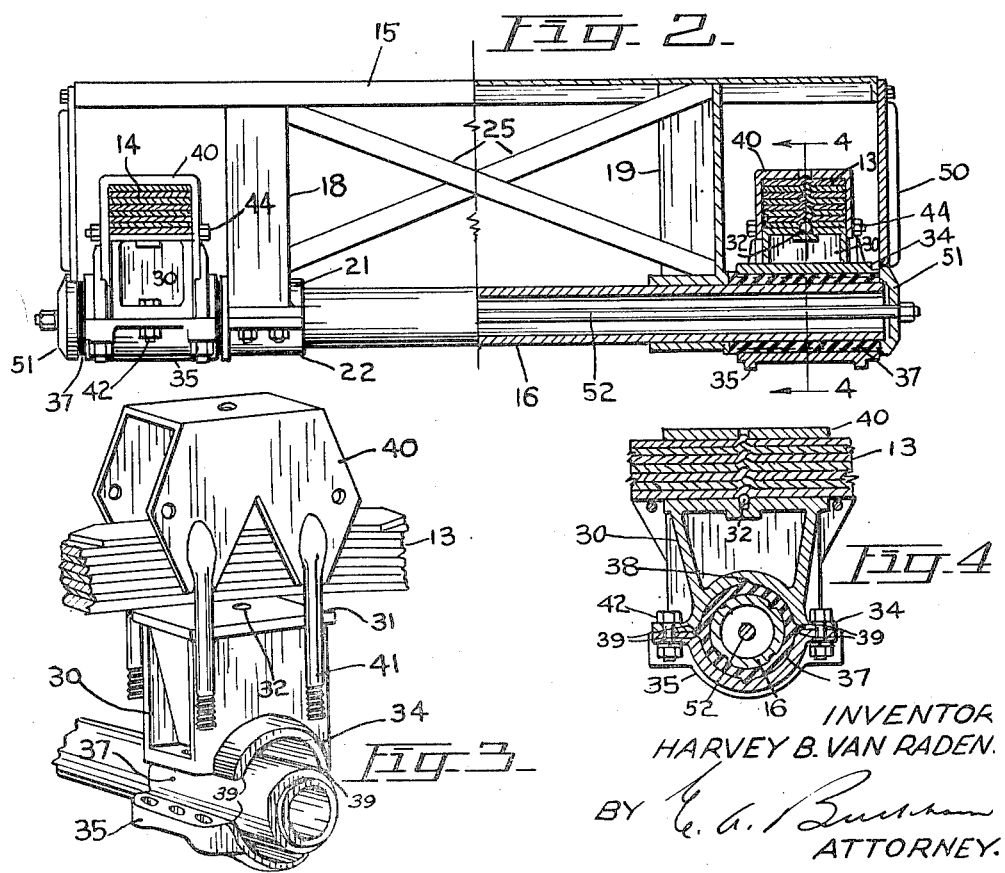
INVENTOR
HARVEY B. VAN RADEN.
BY
ATTORNEY.

Patented Sept. 13, 1949

2,481,891

UNITED STATES PATENT OFFICE 2,481,891

DUAL AXLE WHEEL UNIT

Harvey B. Van Raden, Portland, Oreg., assignor to Peerless Trailer and Truck Service, Inc., Portland, Oreg., a corporation of Oregon Application May 13, 1946, Serial No. 669,332

7 Claims. (Cl. 280—104.5)

This invention relates to automotive truck vehicles and particularly to dual axle wheel units.

In dual axle wheel units for trucks, trailers, and the like the bolster is mounted upon the axles by a pivotal rocker arrangement upon a trunnion about which the axle mounting is permitted to rock in accordance with the up and down movements of one set of wheels with respect to the other. The pivotal arrangements as heretofore provided are intended to be kept well lubricated but because of the fact that the extent of the pivotal movement is relatively slight it is inherently difficult to insure that the entire areas of the adjacent bearing surfaces are properly lubricated and frequently the lubricant as applied is merely forced out the opposite ends of the bearing after contacting only a very limited area of effective bearing surface. Then too, the weight of the load carried by the vehicle tends to force the lubricant out of the opposite ends of the bearing so that the adjacent surfaces are dry in a relatively short period of time after the application of the lubricant. Because of the inherent difficulties in maintaining the bearing surfaces sufficiently lubricated it is necessary frequently to replace the bushings or the trunnions, or both, so that maintenance costs are relatively high.

It is an object of the present invention to provide a new and improved rocker mounting arrangement for heavy duty dual axle wheel units which is low in initial costs as well as in maintenance cost.

Excessive wear occurs in the rocker mountings of the type heretofore provided not only because of lubrication difficulties but also as the result of stresses transmitted therethrough upon turning movements of the vehicle as during rounding of corners as will be explained more fully hereinafter. Not only is such wear entirely eliminated in the spring mounting of the present invention but the wear and tear on tires of the dual axle unit is also very materially lessened.

A further object of the present invention is to provide a new and improved spring mounting arrangement for dual axle wheel units whereby turning movements of the vehicle have no wearing effect upon the mounting and much less wear upon the tires as compared with conventional units.

Additional objects and advantages of the invention will become apparent from the following description taken in connection with the accompanying drawing and the features of novelty will be pointed out with greater particularity in the appended claims.

In the drawings Fig. 1 is a side elevation of the spring mounting arrangement constructed in accordance with one form of the present invention; Fig. 2 is a sectional view taken generally along the line 2—2 of Fig. 1; Fig. 3 is an exploded fragmentary view in perspective further illustrating certain details of the invention; and Fig. 4 is a sectional view taken along the line 4—4 of Fig. 2.

For sake of greater simplicity, the invention will be described with particular reference to a dual axle wheel unit for trailers or semi-trailers though it will be readily understood by those skilled in the art that it is equally applicable to rear wheel units for trucks or other vehicles.

Referring now to the drawings the reference numerals 10 and 11 indicate the axles of a dual axle vehicle unit such as may be used for heavy duty trucks and trailers, the wheels mounted on the ends of the axles being indicated by dotted lines in Fig. 1. The vehicle load is adapted to be transmitted to the axles through a pair of horizontally extending rocker elements such as leaf spring units 13 and 14, the opposite ends of the spring units being suitably mounted upon the axles 10 and 11. It is to be understood that the spring units shown represent any other form of rocker elements mounting the axles upon the trunnion member.

The bolster 15 is fixedly secured to a trunnion shaft 16 extending parallel with the axles and centrally beneath the spring units. While the trunnion shaft is shown as a tubular member it will readily be understood that this shaft need not necessarily be round but may be of any other suitable cross sectional shape. The bolster 15 is mounted upon the shaft 16 between the spring units by uprights 18 and 19, the upper ends of which are welded to the bolster and the lower ends of which are provided with upper split housing caps 21 fitting over the top of the shaft 16 and adapted to be clamped thereto by the lower housing members 22 extending around the lower portion of the shaft 16. The lower housing part 22 may be welded to the shaft 16 in order to prevent relative rotational movement between the shaft and the upright 18 and 19. Upon removal of the bolts connecting the housing parts 21 and 22, the bolster 15 may be removed from the trunnion shaft 16. The uprights 18 and 19 are illustrated as being transversely braced by stiffener members 25.

The spring units 13 and 14 are each mounted upon the opposite ends of shaft 16 by means including a pedestal 30, the upper end of which defines a rectangular flat bearing surface 31 for the spring unit. A recess is provided in the center of the bearing surface 41 for receiving a steel ball 32, the upper half of which projects above the surface 31 and fits cooperatively into a punched recess provided in the lowermost leaf of the spring unit. Each of the leaves of the spring unit are formed with similar struck out protuberances on the upper surface, the various protuberances fitting cooperatively into the recess in the lower surface of the superimposed leaf. The assembly of the leaves of the spring unit is thereby facilitated as well as the mounting of the spring assembly upon the pedestal in the proper centered relation. The lower portion of the pedestal 30 defines the upper half 34 of a horizontally split housing for surrounding the end of the shaft 16, the cooperating lower housing part being indicated at 35. The housing 34, 35 surrounds the shaft 16 in spaced relation therewith and is adapted to be tightly clamped around the cylindrical member 37 fitted over the end of the shaft. The cylindrical member 37 may be of any suitable resilient, deformable material such as, for example, rubber, the length of the member 37 being at least as great as the axial length of the housing 34, 35. The member 37 has a normally smooth outer surface of larger diameter than the inner diameter of the housing. While not essential it is preferred to provide a plurality of grooves or ridges in the adjacent surfaces of the shaft 16 and the housing parts 34, 35 such as indicated at 38 for the purpose of preventing slippage between the surfaces of the shaft and the housing and the adjacent surface of the cushion member 37. The adjacent inner edges 39 of the housing parts 34—35 are rounded or chamfered to provide grooves into which the material of member 37 may be deformed when the member is compressed, the grooves thus providing means to prevent the sleeve material from keeping the housing parts separated.

The spring units are secured onto the pedestals by the clamps 40 which are of rugged proportions as shown clearly in Fig. 3. The clamps are provided with four depending bolts 41 which straddle the trunnion shaft 16 on each side of the pedestal and extend through holes in the flanges of the lower housing part 35. Nuts on the lower ends of the clamp bolts 41 are drawn tight to secure the spring unit onto the upper surface of the pedestal 30 and to compress the cushion member 37 between the housing parts 34, 35. After the housing parts 34, 35 have thus been drawn tightly together an additional pair of bolts 42 are extended through the housing flanges between the clamp bolts 41 on opposite sides of the trunnion shaft for holding the housing parts 34, 35 together in the event that it may be necessary at any subsequent time to remove the clamp unit 40 such as for replacing broken spring leaves.

After the clamp 40 is assembled about the spring unit and drawn tight a pair of transverse bolts 44 are passed through cooperating openings provided in opposite sides of the clamp 40 beneath the spring unit for tying the opposite sides of the clamp together and for further tightening the spring assembly.

The outermost ends of the bolster plate 15 are supported upon the outer extremities of the shaft 16 by removable bracket members 50, the uppermost ends of which are bolted to the down turned end flanges of the bolster plate while the lowermost ends are provided with disc caps 51, each having a circular flange on the side adapted snugly to fit over the outermost end of the shaft 16. The caps 51 on the opposite ends of the shaft 16 are held in place by a tie rod 52 extending axially through the shaft 16 and provided with nuts on the outer ends thereof.

It will be observed that the weight on the bolster is transmitted through the clamps 40 to the spring units. Thus the heavier the load on the vehicle the greater will be the force exerted through the clamp bolts 41 and the top of the clamps 40 to resist any tendency for the leaves of the spring units to bend at their centers. This is the weakest part of the spring and is where most breakages occur in conventional spring mounting due to loosening of the spring clamp bolts under heavy load conditions.

Particular attention is directed to the fact that the axis of the trunnion shaft 16 extends beneath the axes of the wheel axles 10 and 11. This is important in order to equalize braking action between the wheels of the forward and rear axles of the dual axle assembly. It will be understood that if the axis of the trunnion shaft were above the axes of the wheels, then when the brakes are applied the momentum of the load will tend to pivot the dual axle unit upwardly around the axis of the front axle. Such tendency throws a greater proportion of the load upon the front wheels while the rear wheels are tended to be lifted from the ground. The result is that the wear on the tires of the front wheels of the dual axle unit is very much more severe than on the tires of the rear axle wheels. By mounting the trunnion shaft beneath the axes of the two axles of the unit in accordance with the present invention the tendency toward pivotal movement upwardly over the front wheel axle upon application of the brakes is prevented. In this case, upon application of the brakes the force of momentum of the load transmitted through the underslung trunnion shaft 16 will be substantially along a horizontal line extending beneath the axis of the front axle. Upward pivotal movement of the rear axle over the front axle of the unit is thus definitely prevented with the result that the load remains substantially equally distributed between the forward and rear axles with substantial equal braking effort maintained upon the tires of all wheels.

The dual axle unit constructed in accordance with the present invention also results in substantial improvement in the turning action. In the case of metal to metal bushing type spring mountings as heretofore employed the dual axle unit is forced to follow the instantaneous angular turning movements of the steering wheel unit which is accompanied by a transverse dragging of the wheels of the rear dual axle unit, and which in turn results in excessive wear on the tires of the rear unit. Also, due to the resistance of the rear wheels to such sidewise dragging over the road surface, a high twisting thrust is imposed upon the trunnion mounting which results in rapid wear on the bushings and trunnion shaft and necessitates frequent repair or replacement. With the resilient cushion mounting arrangement for the spring units upon the trunnion shaft in accordance with the present invention the turning movement of the steering wheels results in a differential compression of the cylindrical cushion members 37 of the spring mountings on the opposite ends of the trunnion shaft, which in turn results in a delayed action turning of the dual axle unit whereby gradual turning takes place during the continued turning movement of the vehicle. Thus relatively slight turning movements of the steering wheels from one side to the other and back again may take place without effecting any turning of the dual axle unit. Thus, by reason of the cushion spring trunnion mounting of the present invention, wear on the tires of the wheels of the dual axle unit due to sidewise skidding during turning movements of the steering wheels is very materially reduced.

Having described the invention in what is considered to be a preferred embodiment thereof it is desired that it be understood that the specific details shown are merely illustrative and that the invention may be carried out by other means.

What I claim is:

1. In a dual axle wheel unit the combination comprising a pair of springs mounted at opposite ends upon said axles, a trunnion shaft extending parallel with said axles and below the central portions of said springs, the axis of said shaft being below the axes of said axles, means for mounting each of said springs on each of the opposite ends of said shaft comprising an upper and a lower housing part surrounding said shaft in a spaced relation thereto, a clamp fixedly securing the central portion of said spring to the upper surface of said upper housing member, said clamp also securing said lower housing member to said upper housing member, a cylindrical rubber member compressed between said housing members and said shaft, longitudinal grooves in the facing surfaces of said housing member and said shaft for precluding slippage between said housing members and said shaft with respect to said cylindrical member, a cross member extending above said shaft and adapted for supporting a load thereupon, means for fixedly supporting said cross member upon said shaft between said springs, and removable braces for supporting the outer end portions of said cross member upon the outermost ends of said shaft.

2. In a dual axle wheel unit, the combination comprising a bolster, a horizontally extending rocker unit, a trunnion shaft, a pedestal mounted on said shaft, means securing said rocker unit on said pedestal, a bracket fixedly securing said bolster to said shaft adjacent the inner side of said pedestal, and a removable bracket member including a portion fitting cooperatively over the outer extremity of said shaft for supporting the outer end portion of said bolster.

3. In a dual axle wheel unit, the combination comprising a bolster, a pair of axles, a pair of horizontally extending rocker units mounted at opposite ends upon said axles, a trunnion shaft, bracket means fixedly securing said bolster to said shaft between said rocker units, housings surrounding the opposite ends of said shaft, said rocker units being secured to the upper ends of said housings, the axis of said trunnion shaft being beneath the axes of said axles, a resilient compressible member arranged between said housings and said trunnion shaft, and bracket means supporting the outermost end portions of said bolster upon the outermost end portions of said trunnion shaft.

4. In a dual axle wheel unit, the combination comprising a trunnion shaft, a rocker unit extending transversely of said trunnion shaft, a housing fixedly secured to the central portion of said rocker unit, said housing comprising complementary semicylindrical upper and lower members which when brought together form a cylindrical housing completely encircling a portion of said trunnion shaft, the meeting inner edges of said upper and lower members being chamfered to provide grooves, a deformable sleeve of larger outer diameter than the inner diameter of said housing interposed between said trunnion shaft and said housing, and means to draw said members together to compress said sleeve, the material of said sleeve being receivable in said grooves when the sleeve is deformed under compression.

5. A rocker mounting for a dual axle wheel unit, comprising a horizontally extending, load supporting trunnion member, a horizontally extending rocker unit, an upper semicylindrical housing part fixedly secured to the central portion of said rocker unit, a lower complementary housing part, means for drawing said parts together to form a complete, cylindrical housing surrounding a portion of said trunnion member, and a normally smooth-surfaced, cylindrical sleeve of resilient, rubber-like material interposed between said housing and said trunnion member, the normal outer diameter of said sleeve being slightly greater than the inner diameter of said housing, at least one of said upper and lower housing parts having chamfered inner edges contiguous to the other of said housing parts, said chamfered edges providing outwardly extending grooves into which the material of said sleeve may be deformed when compressed upon drawing said parts together by said means.

6. A rocker mounting for a dual axle wheel unit, comprising a horizontally extending, load supporting trunnion member, a horizontally extending rocker unit, an upper semicylindrical housing part fixedly secured to the central portion of said rocker unit, a lower complementary housing part, means for drawing said parts together to form a complete, cylindrical housing surrounding a portion of said trunnion member, and a deformable, cylindrical sleeve interposed between said housing and said trunnion member, the normal outer diameter of said sleeve being slightly greater than the inner diameter of said housing, said upper and lower housing parts having chamfered inner edges on their meeting surfaces which when brought together form outwardly extending grooves into which the material of said sleeve may be deformed when compressed upon drawing said parts together by said means.

7. A rocker mounting for a dual axle wheel unit, comprising a horizontally extending, load supporting trunnion member, a horizontally extending rocker unit, an upper semicylindrical housing part fixedly secured to the central portion of said rocker unit, a lower complementary housing part, means for drawing said parts together to form a complete, cylindrical housing surrounding a portion of said trunnion member, and a cylindrical, deformable sleeve interposed between said housing and said trunnion member, the outer diameter of said sleeve being greater than the inner diameter of said housing, said upper and lower housing parts having chamfered inner edges on their meeting surfaces which when brought together form outwardly extending grooves into which the material of said sleeve may be deformed when compressed upon drawing said parts together by said means, and the adjacent surfaces of said housing parts and said trunnion member having a plurality of depressions therein into which the material of said sleeve is also deformed upon compression thereof.

HARVEY B. VAN RADEN.

REFERENCES CITED

The following references are of record in the file of this patent:

UNITED STATES PATENTS

| Number | Name | Date |
|---|---|---|
| 1,763,767 | Fageol | June 17, 1930 |
| 1,919,033 | Noble | July 18, 1933 |
| 2,047,088 | Thornton | July 7, 1936 |
| 2,071,480 | Williams | Feb. 23, 1937 |
| 2,096,530 | Alden | Oct. 19, 1937 |
| 2,188,952 | Leighton | Feb. 6, 1940 |
| 2,239,286 | Freitag | Apr. 22, 1941 |
| 2,251,416 | Parker | Aug. 5, 1944 |

Certificate of Correction

Patent No. 2,481,891                                                  September 13, 1949

HARVEY B. VAN RADEN

It is hereby certified that errors appear in the printed specification of the above numbered patent requiring correction as follows:

Column 2, line 41, for the word "upright" read *uprights*; line 52, for "surface 41" read *surface 31*; column 4, line 3, for "mounting" read *mountings*;

and that the said Letters Patent should be read with these corrections therein that the same may conform to the record of the case in the Patent Office.

Signed and sealed this 14th day of March, A. D. 1950.

[SEAL]

THOMAS F. MURPHY,
                                                                           *Assistant Commissioner of Patents.*